United States Patent
Hoffmann et al.

(10) Patent No.: US 9,274,868 B2
(45) Date of Patent: Mar. 1, 2016

(54) COMPUTERIZED METHOD AND SYSTEM FOR AUTOMATED SYSTEM DIAGNOSIS DETECTION

(75) Inventors: Werner Hoffmann, Herzogenaurach (DE); Thomas Hubauer, München (DE); Ralf Klössinger, Nürnberg (DE); Michael Pirker, München (DE); Mikhail Roshchin, Feldkirchen (DE)

(73) Assignee: Siemens Aktiengesellschaft, Munich (DE)

(*) Notice: Subject to any disclaimer, the term of this patent is extended or adjusted under 35 U.S.C. 154(b) by 331 days.

(21) Appl. No.: 13/880,483

(22) PCT Filed: Oct. 4, 2011

(86) PCT No.: PCT/EP2011/067253
§ 371 (c)(1),
(2), (4) Date: Jun. 26, 2013

(87) PCT Pub. No.: WO2012/052281
PCT Pub. Date: Apr. 26, 2012

(65) Prior Publication Data
US 2013/0268809 A1 Oct. 10, 2013

(30) Foreign Application Priority Data
Oct. 19, 2010 (EP) .................................... 10188025

(51) Int. Cl.
*G06F 11/00* (2006.01)
*G06F 11/22* (2006.01)

(52) U.S. Cl.
CPC .......... *G06F 11/004* (2013.01); *G06F 11/2257* (2013.01)

(58) Field of Classification Search
CPC . G06F 11/004; G06F 11/2257; G06F 11/079; G06F 11/0793; G06F 11/008; G06N 5/025; G06N 5/04; H04L 41/142; H04L 49/552
See application file for complete search history.

(56) References Cited

U.S. PATENT DOCUMENTS

| | | | | |
|---|---|---|---|---|
| 5,522,014 A | * | 5/1996 | Clark et al. ...................... | 706/45 |
| 5,537,644 A | * | 7/1996 | Hamilton et al. ............... | 706/52 |
| 5,604,841 A | * | 2/1997 | Hamilton et al. ............... | 706/11 |
| 7,260,744 B2 | * | 8/2007 | Wu ................................. | 714/26 |

(Continued)

OTHER PUBLICATIONS

Abstract of "Acquiring and representing strategic knowledge in the diagnosis domain," Mussi et al., vol. 7, Issue 3, pp. 157-165 (1990).
Chapter 4 from "Diagnostic Expert Systems: From Expert's Knowledge to Real-Time Systems," Angeli, Advanced Knowledge Based Systems: Model, Applications & Research, vol. 1, pp. 50-73 (2010).
Powerpoint Presentation entitled "Ontologies to structure models and modeling tasks," Beulens et al. (2002).
"Ontology-Driven Information Systems: Challenges and Requirements," Yildiz et al.

(Continued)

*Primary Examiner* — Nadeem Iqbal
(74) *Attorney, Agent, or Firm* — Schiff Hardin LLP

(57) ABSTRACT

In a method, system, and storage medium for obtaining system diagnosis, a diagnosis domain is described that includes a number of possible diagnoses, the number of possible diagnoses prioritized based on at least one of a number of confidence levels, a preference function, and a calculation of a relationship between a number of confirmed system symptoms and a number of possible diagnoses. A number of hypotheses for incipient system symptoms is generated, and a hypothesis is selected from the generated number of hypotheses. Information is obtained regarding a number of system observations, and a selection relevant diagnostics for the system is obtained.

3 Claims, 2 Drawing Sheets

(56) References Cited

U.S. PATENT DOCUMENTS

| | | | |
|---|---|---|---|
| 2003/0014692 A1 | 1/2003 | James et al. | |
| 2005/0097397 A1* | 5/2005 | Wu | 714/31 |
| 2008/0059839 A1 | 3/2008 | Hamilton et al. | |
| 2009/0183030 A1* | 7/2009 | Bethke et al. | 714/37 |
| 2010/0306588 A1 | 12/2010 | Hamilton et al. | |

OTHER PUBLICATIONS

"Reasoning with Prioritized Information by Iterative Aggregation of Distance Functions," Arieli, Department of Computer Science, Academic College of Tel-Aviv (2008).

Measuring Relevance (2011).

* cited by examiner

COMPUTERIZED METHOD AND SYSTEM FOR AUTOMATED SYSTEM DIAGNOSIS DETECTION

BACKGROUND OF THE INVENTION

1. Field of the Invention

The present invention is directed to a method, system, and a non-transitory, computer-readable data storage medium for diagnosis detection in a system. More precisely, the method, system and storage medium of the present invention are based on an interactive diagnosis detection technique.

2. Description of the Prior Art

For industry, there is a continued need for improved prognostics and diagnostic management of systems.

Conventionally, the concept of fault diagnostics has been understood as the detection of an existing problem or failure in a system, in order to correct it. Today's advances are raising the bar toward machine prognostics, where failure modes and the remaining life of a system can be predicted, and quick and exact intervention may be performed to repair the identified faults. Novel solutions are responsive at least to the need for efficient operations and reduced maintenance costs.

However, particularly for large-scale systems, diagnostic and prognosis are employed for predicting and preventing failures so that expensive equipment does not destroy itself or need to be discarded. Having more data on the faults found (diagnostics) and life expectancy (prognostics) can only help.

Therefore, a further need is to reduce the current reliance on diagnostic sensors, which already exist in many industrial systems, in favor of intelligent systems that correlate the data from these sensors and use it to make predictions and render possible diagnostics.

Improvements in prognosis and diagnostic through the development of better sensors and more effective algorithms have provided more lead time to respond to evolving failures. In addition, improved prognosis and diagnostic brings the benefits of increased safety and operational efficiency, reduction in lost operational hours, lower maintenance costs, and decreased likelihood of secondary damage from failing system components, reduced inventory requirements, extended subcomponent life, and improved product quality. A more fully developed prognosis and diagnostic capability enables the better gauge when an impending system failure is acceptable, and when it isn't, especially in industrial systems where some failures may take lives and cost millions. In addition, better developed prognosis and diagnostic systems will help judge when redundancy is needed in a system, by determining which mission-critical systems need backup. Prognosis and diagnostic systems also help reliably decide when to switch to a redundant system, if one exists, by providing more accurate mechanisms for detecting and predicting impending failures.

Therefore a need still exists for an intelligent automated prognosis and diagnostic methods that may be applicable to a wide range of industrial systems.

SUMMARY OF THE INVENTION

An object of the present invention is to provide a solution to the above problems in a method for diagnosis detection as well as a corresponding system and data storage medium.

In accordance with an aspect of the present invention a method for diagnosis detection in a system includes describing a diagnosis domain that includes a number of possible diagnoses, prioritizing the number of possible diagnoses based on at least one of a number of confidence levels, a preference function, and a calculation of a relationship between a number of confirmed system symptoms and a number of possible diagnoses, generating a number of hypotheses for incipient system symptoms, selecting a hypothesis from the generated number of hypotheses, obtaining information regarding a number of system observations, and obtaining a selection of relevant diagnostics for the system.

In accordance with another aspect of the present invention a system has a data bus system, a memory coupled to the data bus system, the memory containing computer usable program code, a processing unit coupled to the data bus system. The processing unit executes the computer usable program code to describe a diagnosis domain that includes a number of possible diagnoses, prioritize the number of possible diagnoses based on at least one of a number of confidence levels, a preference function, and a calculation of a relationship between a number of confirmed system symptoms and a number of possible diagnoses, generate a number of hypotheses for incipient system symptoms, select a hypothesis from the generated number of hypotheses, obtain information regarding a number of system observations, and obtain a selection of relevant diagnostics for the system.

In accordance with a further aspect of the present invention, a non-transitory computer-readable data storage medium is encoded with programming instructions for performing diagnosis detection in a system. The programming instructions, when the storage medium is loaded in a computer, cause the computer to describe a diagnosis domain that includes a number of possible diagnoses, prioritizing the number of possible diagnoses based on at least one of a number of confidence levels, a preference function, and a calculation of a relationship between a number of confirmed system symptoms and a number of possible diagnoses, generate a number of hypotheses for incipient system symptoms, select a hypothesis from the generated number of hypotheses, obtain information regarding a number of system observations, and obtain a selection of relevant diagnostics for the system.

Compared to other solutions offered in the art, the solution provided by the present invention allows hypothetically to identify the most relevant diagnoses. It offers modularity to a user by employing the system diagnosis method since it comprises the steps of hypotheses generation and hypotheses selection. The input for hypotheses generation and hypotheses selection is based on any preference function. As such, it provides the advantages related to the stand alone approach for any selection task.

Therefore the method, apparatus and the computer program of the present invention provide advantages related at least to their ability of formal description of the diagnosis problems. The system diagnosis detection proposed by the present invention it is a model driven approach that arrives at a selection of possible system diagnoses via modeling, versus extensive programming as it offered by system diagnosis methods available in the art. It is a scalable system diagnosis method that permits an iterative process leading to a precise diagnostic.

Other characteristics and advantages of the present invention will be apparent in connection with the dependent claims.

In accordance with the present invention, the method of system diagnosis of the present invention is further characterized by the step of prioritizing the number of possible diagnosis being an automated step. The step of selecting a hypothesis from the generated number of hypotheses is based on priorities of the hypothesis among each other and their relevance to already classified possible diagnoses. The step of obtaining information regarding a number of system observations takes into account a relevancy of the system observations. The relevancy of system observations is defined automatically, based on at least one of the generated number of hypothesis and the selected hypothesis. The basic steps are repeated for every new system incident.

Figure 1:
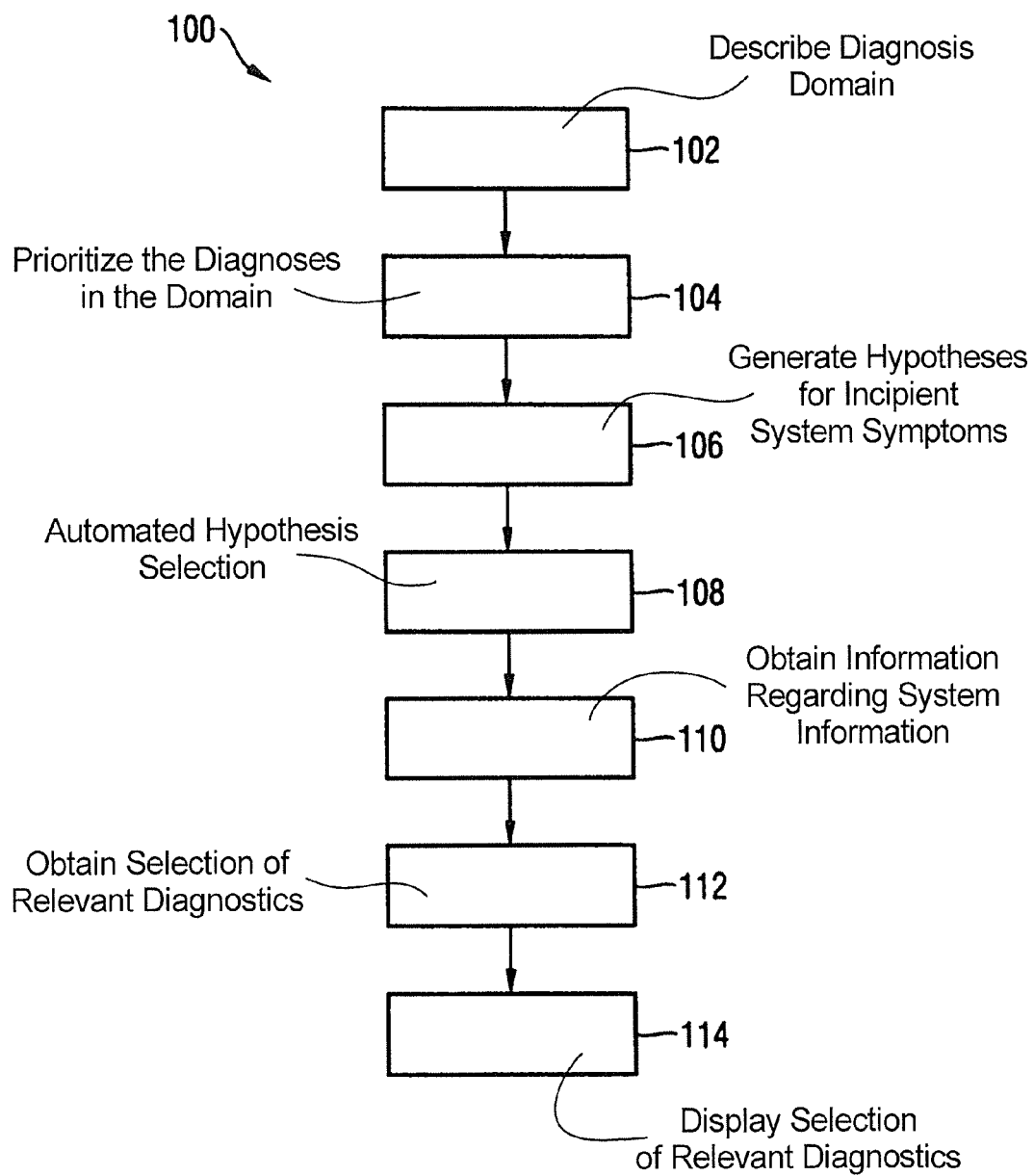
FIG. 1 is a flowchart of an embodiment of the method for diagnosis detection in a computer system, in accordance with the present invention.

Non-limiting and non-exhaustive embodiments of the present invention are described with reference to the above referenced figures, wherein like reference numerals refer to like parts throughout the various views unless otherwise specified. The order of description should not be construed as to imply that these operations are necessarily order-dependent.

DESCRIPTION OF THE PREFERRED EMBODIMENTS

As will be appreciated by those skilled in the art, the present disclosure may be embodied as a model, method, system or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

In the present invention, "diagnosis" is understood as the identification of the nature of anything, either by process of elimination or other analytical methods. Diagnosis is used in many different disciplines, with slightly different implementations on the application of logic and experience to determine the cause and effect relationships. Diagnostic and its tools are used by the respective professions in medicine, science, engineering, business. Diagnosis is also used in many other trades and professions to determine the causes of symptoms, mitigations for problems, or solutions to issues.

When a technical system encounters a failure, a technician attempting to remedy the situation receives information regarding a number of symptoms of the situation. Based on the number of symptoms received the technician must interpret the situation, in most cases without assistance, and attempt to remedy the situation.

Additional factors that complicate for the technician the rendering of a correct diagnostic regarding the encountered situation are that the definition of the diagnoses is subject to regular change, and that its own or the observations made available to him may be heterogeneous, incomplete, or uncertain. In its attempt to interpret the situation, for the technician the reason for the particular situations is usually unknown and he may only attempt to find out the reason via for example a root-cause analysis. Usually a full diagnostic requires a roadmap of the problematic transaction to address the issue and expedite problem resolution. Especially in environments employing distributed, interconnected applications, root cause analysis is difficult. These applications often execute on heterogeneous systems that reside in different locations and are owned by different groups. As a result, arriving at the diagnostics often takes a lot of time and generates supplementary costs. In addition, until the problem is resolved, the affected processes may slow down, display incorrect data, or even shut down completely, in each case adversely effecting end users.

For the attending technician the rules of situations are difficult to operate, to process and to analyze, and to correctly predict the behavior in terms of maintenance, he must take into account complete information.

Should the system diagnostic be obtained via an automated diagnostic system, a typical result of any automated diagnostic system is a classification of an observed situation in terms of diagnoses with a certain level of confidence. In the art, an example of classification for diagnoses with a certain level of confidence are certain diagnostic, plausible diagnostic or hypothetical diagnostic.

In terms of the system diagnostic generated by the system, there are two possibilities: it is either that such a classification of an observed situation is sufficient, such as an explanation that consists of the set of possible diagnoses, where some diagnoses are more probable than others, or such a classification requires further refinement regarding the set of possible diagnoses, by acquiring additional relevant information about the situation with the scope of prioritizing some possible diagnoses and drop others. This may be achieved for example via an interaction with a technician, who is given the reasons for uncertain results of diagnosis and who is requested additional relevant information for further detailing of diagnosis results. Alternatively, it may be achieved via an interaction with a knowledge base that may provide the additional relevant information for further detailing of diagnosis results.

Therefore, in order to solve the problem of making available an intelligent automated prognosis and diagnostic method that may be applicable to a wide range of industrial systems, the present invention proposes the employment, among others, of a method like the one illustrated in FIG. 1.

A technician receives a classification of the observed situation, where each more or less relevant diagnosis result appears as a problem isolation, and is marked with a confidence level. As the result, in order to provide a precise result to the diagnosis analysis, the technician should be in possession of information at least about: classified diagnoses with some confidence, that are classified either as a numerical value, percentage or some fuzzy label, the symptoms that were the reason for the detection of possible problems, a description of the symptoms which were not confirmed, and additionally a preference function may be assigned to the available set of all symptoms and diagnoses, which identifies rules for priorities of diagnoses and symptoms among each other.

Referring now to FIG. 1, the figure illustrates a flow chart of the method 100 for diagnosis detection in a system, in accordance with the present invention.

Method 100 consists at least of step 102 of describing a diagnosis domain comprising a number of possible diagnoses. Said description of the diagnosis domain may be exemplarily executed via a logic based ontology model which is describing the diagnosis domain and the input from the classification for possible diagnosis. The logic based ontology model may employ a logic-based formal diagnosis detection method, the formal diagnosis detection method being built by providing a number of ontologies interrelated via a number of logical statements, the number of ontologies representing system observables and expert knowledge regarding the system, and coordinating the expert knowledge regarding the system with the system observables to describe a system diagnostic domain.

Method 100 also comprises a step 104 of prioritizing the number of possible diagnoses from the diagnostic domain based on at least one of a number of confidence levels, a preference function, and a calculation of a relationship between a number of confirmed system symptoms and a number of possible diagnoses.

For example, the concept of diagnosis confirmed is a subclass of the concept diagnosis for a certain input. Subclasses of the concept diagnosis confirmed may be for example "very confident" or "some level of confidence". They may be named as such due to the existing confidence mark of their particular input. The concept of diagnosis_not_confirmed is as well a subclass of the concept diagnosis for the same input, where some diagnoses are of the very low confidence level or refer to problems not yet isolated. Each of the sub-classes may in turn include a diagnosis such as diagnosis 1, diagnosis 2, diagnosis 3, diagnosis 4, and diagnosis 5. The diagnoses 1 to 5 may be part of the diagnosis domain and be a possible diagnosis.

Diagnosis 1 to 5 may be part of the diagnosis domain for an observed system situation that is classified. The system situation may be described via symptoms, which may be classified via the concept symptoms. The concept of symptoms confirmed is a subclass of the concept symptom. For the concept of symptoms confirmed, there are further subclasses for all existing symptoms. Once a system symptom is confirmed, its instance appears as subclass of the respective concept. Symptoms may as well be unconfirmed, and may be a subclass of the concept symptom and may be used as a representation as parent class of the symptoms not yet detected. If all the diagnoses for the system are certain diagnoses then the method of the present invention advances to displaying for the user all the tentative diagnoses. If not all the diagnoses are certain, then the method advances to determining other possible diagnosis.

The prioritization of already calculated diagnoses may occur automatically. The prioritization may be based on a predefined preference function. The preference function may be employed to calculate the order of possible diagnoses and/or the additional parameters. The prioritization may be based on a predefined confidence level regarding possible diagnoses. The confidence level may be a calculated value, based on the relative number of observed symptoms among all symptoms, which define a diagnosis description. The confidence level may be a calculated value, based on the relative number of diagnoses, which were identified as possible due to this symptom, or it may be a relative value of the observed features of the system.

For the automated prioritization of the classified possible diagnoses a priority aggregation function may also be defined. The priority aggregation function employs for example a preference function and additional parameters.

For example a high priority diagnosis may be calculated the logical statement of "very confident or diagnosis and has relative estimate >0.5". A low priority diagnosis may be calculated via the logical statement of "the diagnosis and not high priority". In the above "has relative estimate" is dynamically calculated in run time, depending on the number of confirmed symptoms in relation to the definition of the diagnosis.

In a step 106 the method generates a number of hypotheses for incipient system symptoms. The reasoning leading to the number of hypothesis generation for incipient system symptoms may employ an abduction logical algorithm. The abduction is a reasoning method which infers a set of possible causes from rules and results. In general abduction consists of computing hypotheses about possible explanations for the particular observations, leading therefore to possible diagnoses. Given a knowledge base T and a number of observations, such as appeared symptoms and computed diagnoses, the abduction includes computing hypotheses based on the information from the knowledge base and the observables. The hypotheses are hypothetical logical statements, are hypothetical and for the purposes of the method of the present invention, they do not need to prove to be correct with respect to future observations.

Therefore, the abduction for the generation of a number of hypothesis for incipient system symptoms may be defined a triple logical statement, (Hypotheses, Observations, contents of T), where Hypotheses is a finite set of hypothesized symptoms, {symptoms}\Observed Situation, where ObservedSituation is a logical statement indicative if the observed symptoms, where Observations is the set of observed symptoms and their interpretations, classified possible diagnoses that are assumed to be true, and T is a knowledge base which relates the Diagnoses to the Observations.

In step 108 the diagnosis method 100 supports automated hypothesis selection, based on their priorities among each other and their relevance to the already classified possible diagnoses.

The hypothesis selection is an iterative procedure performed on the sets of diagnoses, hypothetical symptoms, and the preference function and additional priority parameters. The selection is aimed at interactively reducing their number to what is to be considered possible. For example "relevant" among still incipient symptoms, and their associated features, are selected by the algorithm. The user of the diagnostic system is prompted to test one or several features, and enters the observations to the system. The new information is used to drop diagnoses which are inconsistent with the new information. In the art, abduction theories are known to produce an exponential number of hypotheses. For these theories, the support selection task is undecidable. Herewith the method of the present invention allows a decidable and fast selection algorithm by restricting hypothesis generation and applying a relevance measure for the selection procedure and thus obtaining a finite input for the hypotheses obtained.

In step 110, in accordance with the present invention, obtaining information regarding a number of system observations, for the automated hypothesis selection of relevant hypothetical symptoms, a priority aggregation concept has to be defined, using a preference function and additional parameters. One possible selection procedure is calculating the relevance measure for symptoms taking into account additional parameters previously defined.

Therefore, a relevance measure may be stated as equal to $P2(Si) \times P3(Si) \times I(Si)$,
where:
P2 is a calculated value, based on the relative number of diagnoses, which were identified as possible due to this symptom;
P3 is a relative value of the observed features for this particular symptom; and
I(Si) is a measure of the interestingness of the symptom, that is defined as $$I(Si) = \Sigma j (P1(Dj) \times |(Dj \backslash ObservedSituation) \cap Si|)$$

where:
P1 is a calculated value, based on the relative number of the observed symptoms among all symptoms, which define a diagnosis description;
$|(Dj \backslash ObservedSituation) \cap Si|$ represents whether Si belongs to the definition of the respective diagnosis, and takes the values of 1 if true and 0 if false, and
$\Sigma j$ is a sum of all preference values of the respective diagnoses to which the symptom actually belongs.

From all of the above, in step 112 of the present invention, a selection of relevant diagnostics for the system are obtained, which can be presented to a view in displayed form in step 114.

The present invention may also take the form of a system comprising at least a data bus (202) system, a memory (208) coupled to the data bus system, wherein the memory includes computer usable program code, a processing unit (204) coupled to the data bus system. The processing unit executes the computer usable program code to describe a diagnosis domain that includes a number of possible diagnoses, prioritize the number of possible diagnoses based on at least one of a number of confidence levels, a preference function, and a calculation of a relationship between a number of confirmed system symptoms and a number of possible diagnoses, generate a number of hypotheses for incipient system symptoms, select a hypothesis from the generated number of hypotheses, obtain information regarding a number of system observations, and obtain a selection of relevant diagnostics for the system.

Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission medium such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

A computer program product in accordance with the present invention in the form of a non-transitory, computer-readable data storage medium encoded with programming instructions for diagnosis detection in a system. When the storage medium is loaded into a computer, the programming instructions cause the computer to describe a diagnosis domain that includes a number of possible diagnoses, prioritize the number of possible diagnoses based on at least one of a number of confidence levels, a preference function, and a calculation of a relationship between a number of confirmed system symptoms and a number of possible diagnoses, generate a number of hypotheses for incipient system symptoms, select a hypothesis from the generated number of hypotheses, obtain information regarding a number of system observations, and obtain a selection relevant diagnostics for the system.

A computer program product that executes the method of diagnosis detection in a system of the present invention resides in an embedded hardware module in the studied devices. Alternatively, the computer program product may reside on a microcontroller, in a pre-compiled form to be used at the diagnostic/intervention site. Alternatively, the computer program product may reside on a central computer, which may host all expert knowledge or be a combination of embedded at the site, and a central server.

Figure 2:
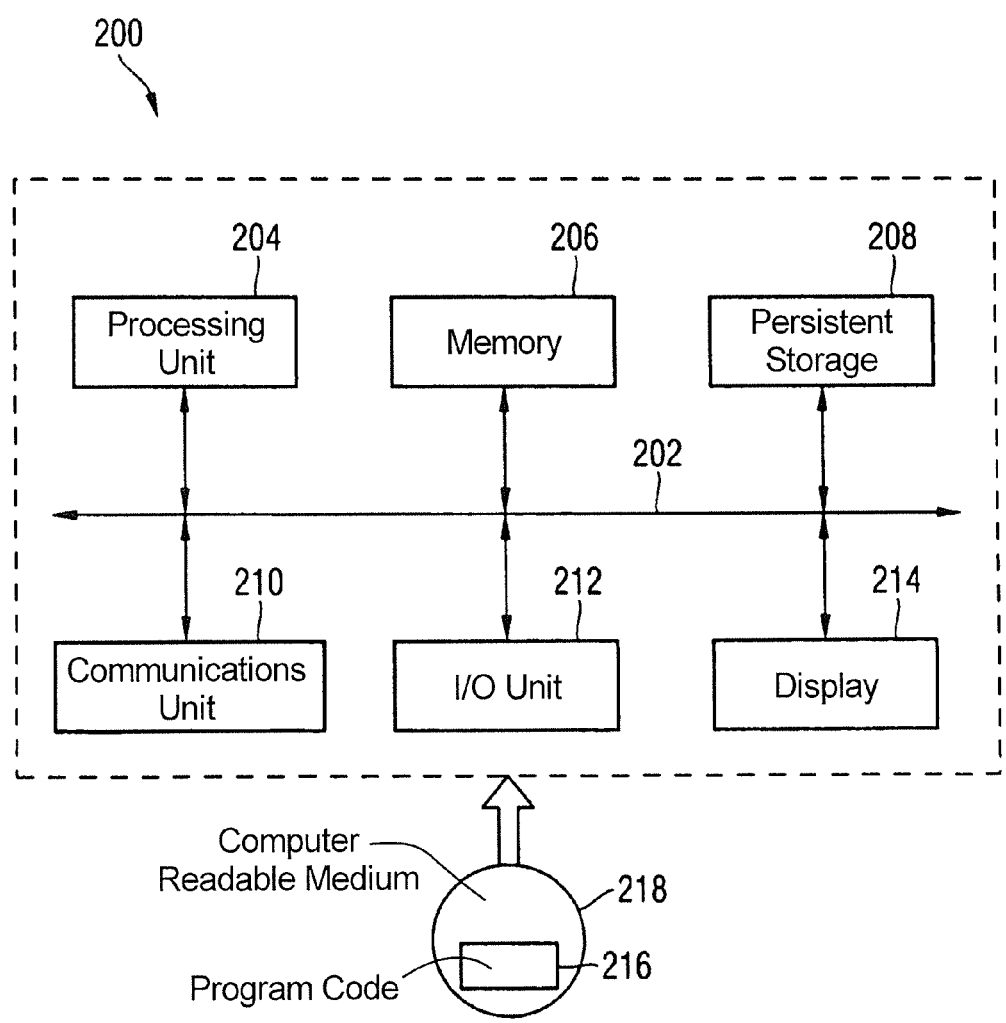
FIG. 2 is a block diagram of an embodiment of a data processing system for implementing the method in accordance with the present invention.

Referring now to FIG. 2, FIG. 2 represents an embodiment of a data processing system 200 in which an embodiment of a system diagnosis detection application may be implemented. The data processing system of FIG. 2 may be located and/or otherwise operate at any node of a computer network, which may exemplarily comprise clients, servers, etc. In the embodiment illustrated in FIG. 2, the data processing system 200 includes a communications network 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

In some embodiments, memory 206 may be a random access memory or any other suitable volatile or non-volatile storage device. Persistent storage 208 may take various forms depending on the particular implementation. For example, persistent storage 208 may contain one or more components or devices. Persistent storage 208 may be a hard drive, a flash memory, a rewritable optical disk, a rewritable magnetic tape, or some combination of the above. The medium used by persistent storage 208 also may be removable such as, but not limited to, a removable hard drive.

Communications unit 210 provides for communications with other data processing systems or devices. In these examples, communications unit 210 is a network interface card. Modems, cable modem and Ethernet cards are just a few of the currently available types of network interface adapters. Communications unit 210 may provide communications through the use of either or both physical and wireless communications links.

Input/output unit 212 enables input and output of data with other devices that may be connected to data processing system 200. In some embodiments, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable medium, such as memory 206 or persistent storage 208.

Program code 216 is located in a functional form on computer readable medium 218 that is selectively removable and may be loaded onto or transferred to data processing system 200 for execution by processor unit 204. Program code 216 and computer readable medium 218 form computer program product 220 in these examples. In one example, computer readable medium 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable medium 218 also may take the form of a persistent storage, such as a hard drive, a thumb drive, or a flash memory that is connected to data processing system 200. The tangible form of computer readable medium 218 is also referred to as computer recordable storage medium. In some instances, computer readable medium 218 may not be removable.

Alternatively, program code 216 may be transferred to data processing system 200 from computer readable medium 218 through a communications link to communications unit 210 and/or through a connection to input/output unit 212. The communications link and/or the connection may be physical or wireless in the illustrative examples. The computer readable medium also may take the form of non-tangible medium, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. For example, a storage device in data processing system 200 is any hardware apparatus that may store data. Memory 206, persistent storage 208, and computer readable medium 218 are examples of storage devices in a tangible form.

Accordingly, the disclosed embodiments present a model, method and computer program product for detecting system diagnostic. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

In addition, the flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Although modifications and changes may be suggested by those skilled in the art, it is the intention of the inventors to embody within the patent warranted heron all changes and modifications as reasonably and properly come within the scope of their contribution to the art.

We claim as our invention:

1. A method for identifying a diagnosis of a system incident in a computerized system upon occurrence of said system incident, said system incident producing incipient symptoms in said computerized system before said system incident results in a failure of said computerized system, said method comprising:

providing a processor with an electronic description of said incipient symptoms and, in said processor, defining a diagnosis domain from said incipient symptoms, said diagnosis domain comprising a plurality of possible diagnoses of said system incident;

in said processor, automatically generating, for each possible diagnosis in said diagnosis domain, a confidence level that numerically expresses a probability that the respective possible diagnosis is a correct diagnosis of said incipient symptoms;

providing said processor with a first electronic input that describes a predetermined preference function for making a selection of the possible diagnoses in said diagnosis domain based on their respective confidence levels;

providing said processor with a second electronic input that describes confirmed symptoms of said computerized system;

in said processor, automatically prioritizing said possible diagnoses in said diagnosis domain according to a predetermined combination of said confidence levels, said preference function, and said confirmed symptoms;

in said processor, applying an abduction algorithm to said incipient symptoms and a selected subset of the prioritized possible diagnoses that are higher in said prioritization, to obtain, for each possible diagnosis in said subset, a corresponding hypothesis for said system incident;

providing said processor with a third electronic input that describes observed system observations regarding operation of said computerized system;

in said processor, applying said system observations to the respective hypotheses corresponding to the possible diagnoses in said subset, to select at least one of said hypotheses as an explanation for said system incident; and at a display monitor in communication with said processor, displaying, as a diagnosis of said system incident, a description of the possible diagnosis that corresponds to said at least one selected hypothesis.

2. A diagnostic system for a computerized system in which a system incident occurs having incipient symptoms associated therewith, said diagnostic system being configured to identify a diagnosis for said system incident from said incipient systems before said system incident results in a failure of said computerized system, said diagnosis system comprising:

a processor provided with an electronic description of said incipient symptoms, said processor being configured to define a diagnosis domain from said incipient symptoms, said diagnosis domain comprising a plurality of possible diagnoses of said system incident;

said processor being configured to automatically generate, for each possible diagnosis in said diagnosis domain, a confidence level that numerically expresses a probability that the respective possible diagnosis is a correct diagnosis of said incipient symptoms;

said processor being provided with a first electronic input that describes a predetermined preference function for making a selection of the possible diagnoses in said diagnosis domain based on their respective confidence levels;

said processor being provided with a second electronic input that describes confirmed symptoms of said computerized system;

said processor being configured to automatically prioritize said possible diagnoses in said diagnosis domain according to a predetermined combination of said confidence levels, said preference function, and said confirmed symptoms;

said processor being configured to apply an abduction algorithm to said incipient symptoms and a selected subset of the prioritized possible diagnoses that are higher in said prioritization, to obtain, for each possible diagnosis in said subset, a corresponding hypothesis for said system incident;

said processor being provided with a third electronic input that describes observed system observations regarding operation of said computerized system;

said processor being configured to apply said system observations to the respective hypotheses corresponding to the possible diagnoses in said subset, to select at least one of said hypotheses as an explanation for said system incident; and a display monitor in communication with said processor, said processor being configured to display, as a diagnosis of said system incident, a description at said display monitor of the possible diagnosis that corresponds to said at least one selected hypothesis.

3. A non-transitory, computer-readable data storage medium encoded with programming instructions, said data storage medium being loaded into a processor of a diagnostic system that is in communication with a computerized system, said computerized system having a system incident that occurs therein that has incipient symptoms associated therewith, and said programming instructions configuring said diagnostic system to identify a diagnosis for said system incident before said system incident results in a failure of said computerized system, by causing said processor to:

receive an electronic description of said incipient symptoms and, in said processor, defining a diagnosis domain from said incipient symptoms, said diagnosis domain comprising a plurality of possible diagnoses of said system incident;

generate, for each possible diagnosis in said diagnosis domain, a confidence level that numerically expresses a probability that the respective possible diagnosis is a correct diagnosis of said incipient symptoms;

receive a first electronic input that describes a predetermined preference function for making a selection of the possible diagnoses in said diagnosis domain based on their respective confidence levels;

receive a second electronic input that describes confirmed symptoms of said computerized system;

prioritize said possible diagnoses in said diagnosis domain according to a predetermined combination of said confidence levels, said preference function, and said confirmed symptoms;

apply an abduction algorithm to said incipient symptoms and a selected subset of the prioritized possible diagnoses that are higher in said prioritization, to obtain, for each possible diagnosis in said subset, a corresponding hypothesis for said system incident;

receive a third electronic input that describes observed system observations regarding operation of said computerized system;

apply said system observations to the respective hypotheses corresponding to the possible diagnoses in said subset, to select at least one of said hypotheses as an explanation for said system incident; and at a display monitor in communication with said processor, displaying, as a diagnosis of said system incident, a description of the possible diagnosis that corresponds to said at least one selected hypothesis.

* * * * *